Patented Mar. 11, 1924.

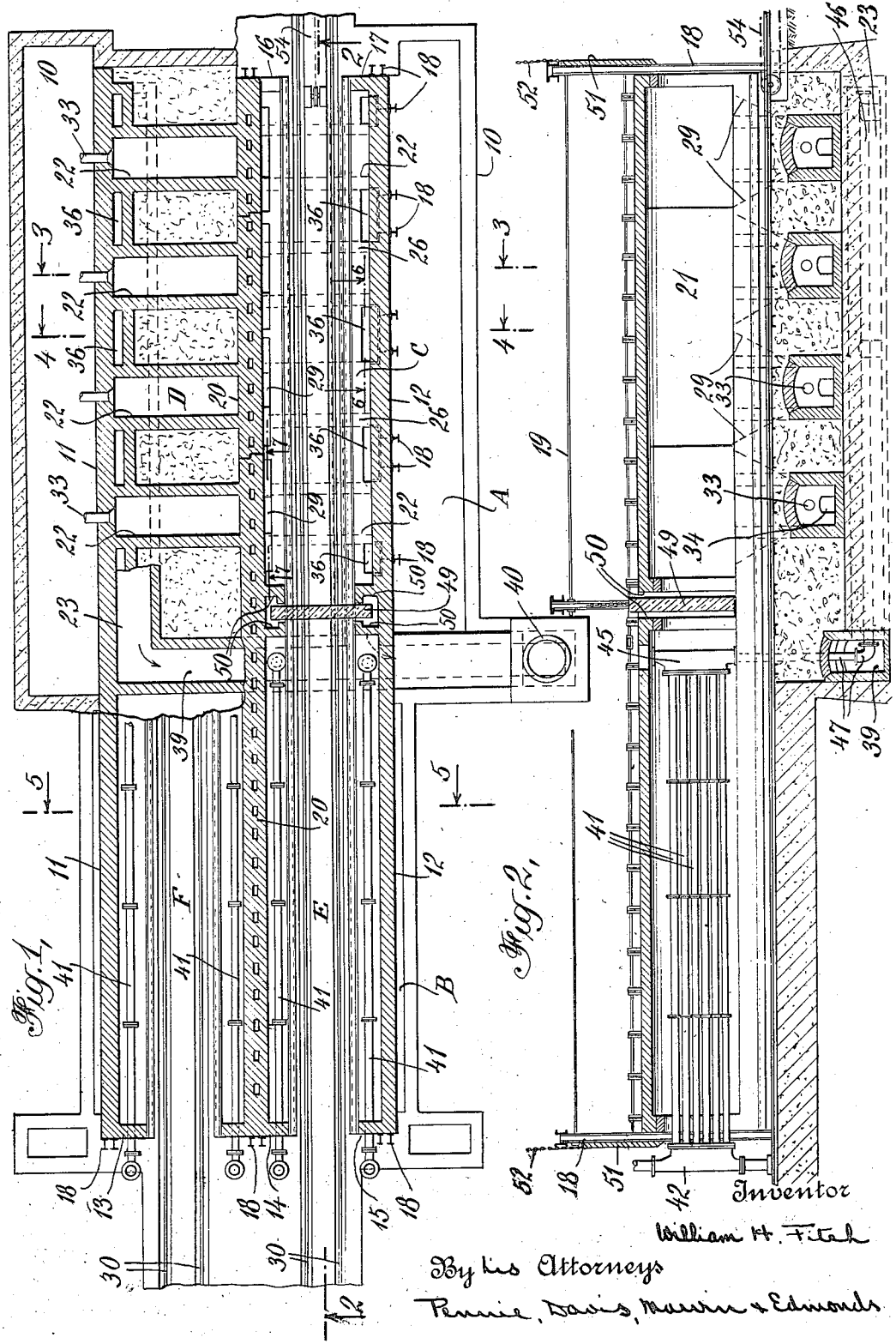

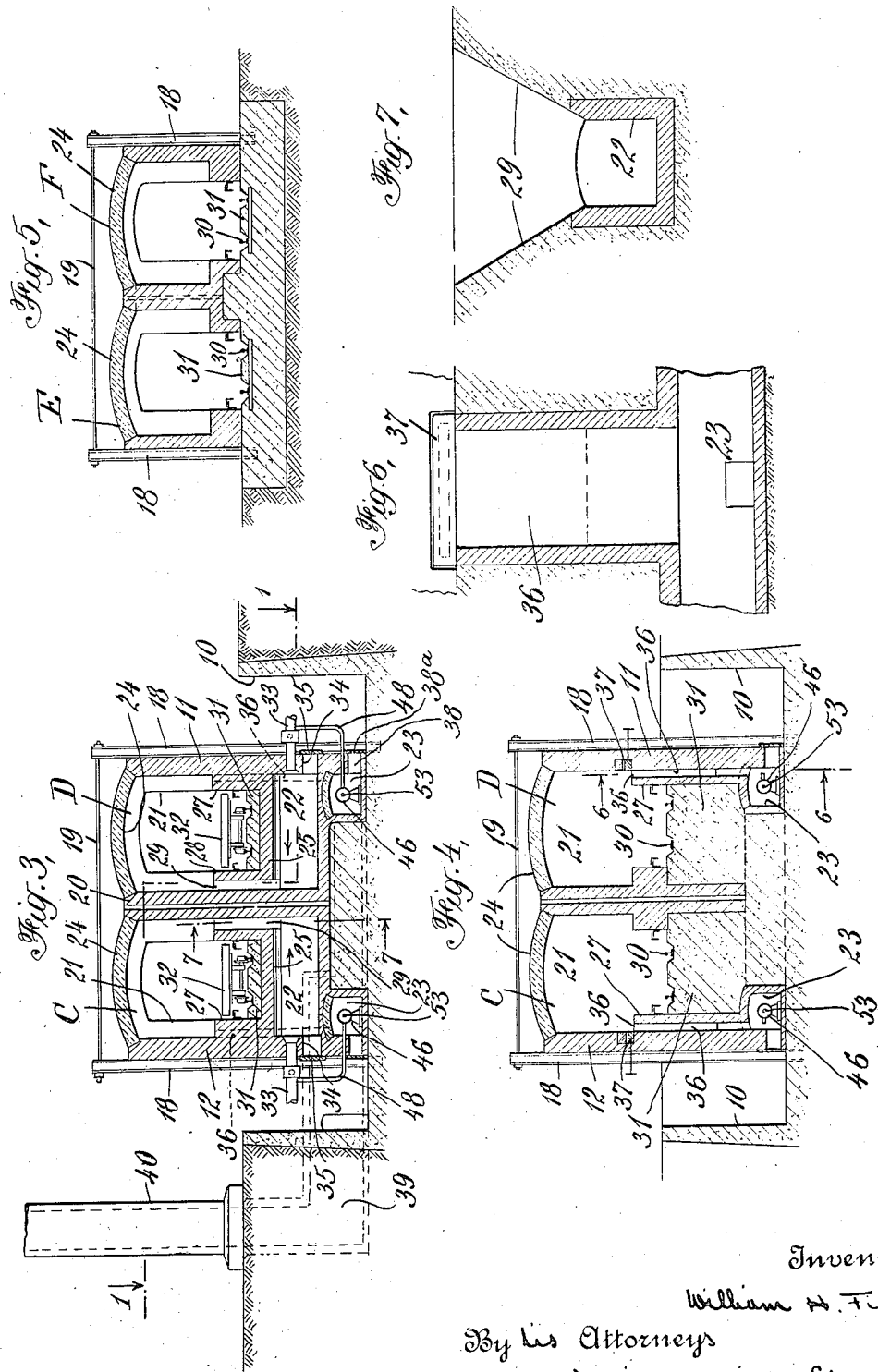

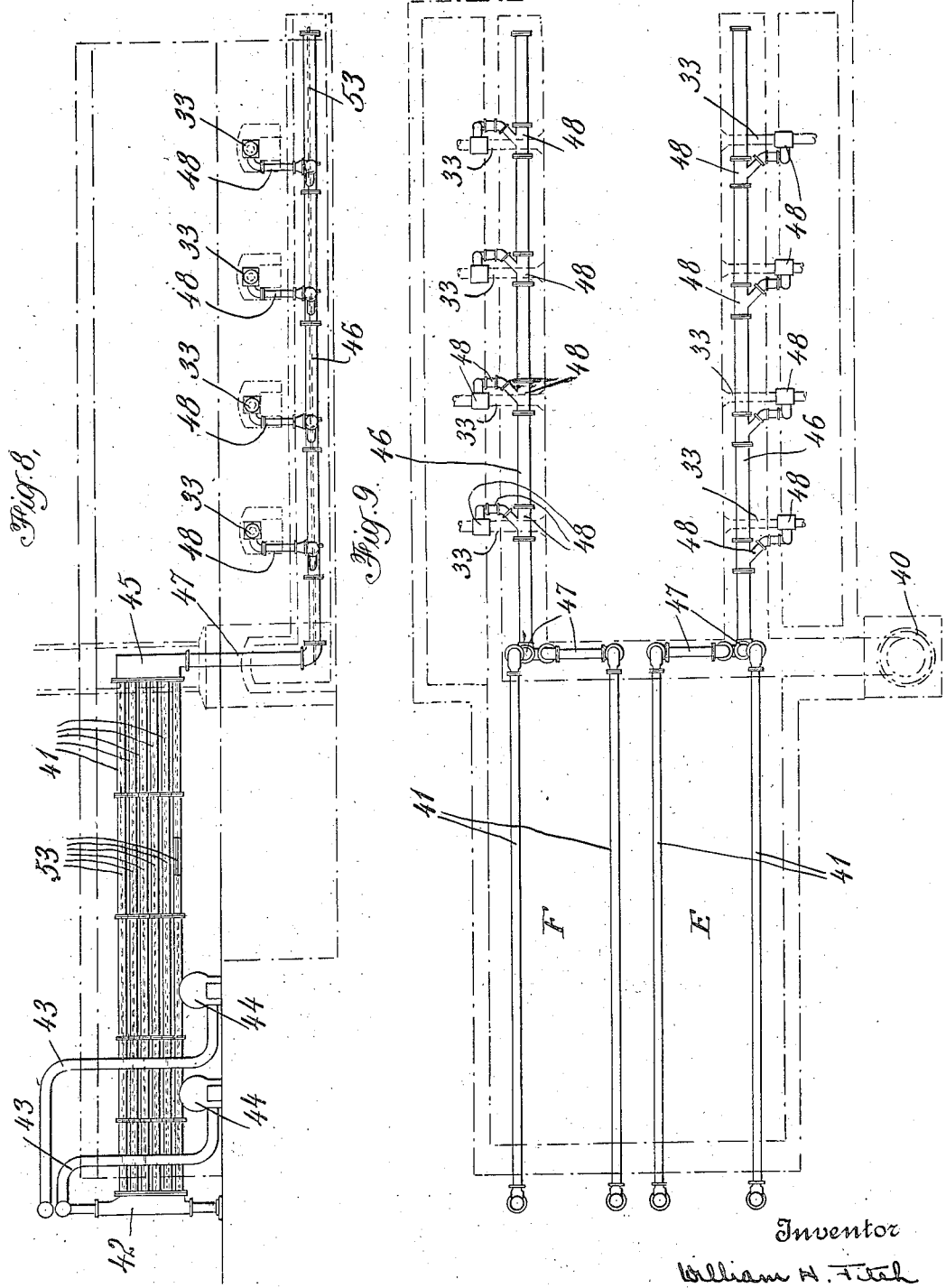

1,486,369

UNITED STATES PATENT OFFICE.

WILLIAM HENRY FITCH, OF ALLENTOWN, PENNSYLVANIA.

CONTINUOUS HEATING FURNACE.

Application filed July 27, 1921. Serial No. 487,887.

*To all whom it may concern:*

Be it known that I, WILLIAM HENRY FITCH, a citizen of the United States, residing at Allentown, in the county of Lehigh, State of Pennsylvania, have invented certain new and useful Improvements in Continuous Heating Furnaces; and I do hereby declare the following to be a full, clear, and exact description of the invention, such as will enable others skilled in the art to which it appertains to make and use the same.

This invention relates to continuous heating furnaces of the underfired type, and involves the provision of a furnace of this character which is particularly adapted for use as an annealing furnace in which the materials to be treated are transported through the furnace by means of conveyors or cars.

The furnace comprises a heating unit and a cooling unit, the heating unit preferably including a heating chamber in which the materials are first subjected to heat treatment, combustion chambers for supplying heat to the heating chamber and a flue chamber, these various chambers being connected by passages through which the gases of combustion may circulate to heat the material after which it is conducted through the flue chamber to the atmosphere. The cooling unit into which the material is introduced, after being subjected to heat treatment in the heating unit, consists of a cooling chamber which, in the preferred construction, forms with the heating chamber a continuous compartment from one end of the furnace to the other, through which the material is conveyed on cars mounted on tracks running through the compartments.

The combustion chambers are designed primarily for the use of pulverized coal, but such fuels as oil, natural gas and manufactured gas may be used, and they are, therefore, equipped with suitable burner tubes to introduce the fuel into the combustion chambers, these tubes being supplied with air under pressure to support combustion of the fuel. In order to effect economy in the use of fuel, the air supplied to the burner tubes is preferably preheated, and it is a feature of the present invention to provide a recuperative system for utilizing the heat contained in the gases of combustion and also that given off by the material in the cooling unit of the furnace to preheat the air supplied to the burner tubes. The recuperative device is rendered highly effective, and its efficiency greatly enhanced by extending it throughout the cooling unit and flue chamber of the furnace so that the available waste heat in every part of the furnace may be utilized to the greatest extent.

In one form of construction, the heating unit has two flue chambers, and the recuperator system consists of a plurality of pipes forming a heat conducting surface in the cooling chamber, and a single pipe extending through each flue chamber in each of which it is surrounded by the exhaust gases of combustion. Such an arrangement of the recuperator system is of particular advantage in connection with a conveyor for the material, through the heating and cooling chambers, consisting of a number of cars placed end to end and extending throughout the compartment of the furnace formed by the heating and cooling chambers. Some of the cars will occupy the length of the heating chamber and the remainder the cooling chamber so that by moving the cars forwardly the material carried thereon is first subjected to heat treatment in the heating chamber and then gradually moved through the cooling chamber, in the latter of which the heat given off by the material in cooling is absorbed by the heat conducting surface of the recuperative device to heat the air supplied to the burner tubes. The air which is forced into the recuperator by means, for example, of a blower taking air preferably from the atmosphere flows through the heat conducting pipes into the portion of the recuperator system passing through the flue chambers of the furnace in which it is further heated by the exhaust gases. The heating effect of the recuperator is enhanced by the use of pipes or rods, commonly called "core busters", supported within the tubes both in the cooling and flue chambers by which the air passing through the recuperator pipes is forced closer to the surface of the pipes and hence is more effectively subjected to the heating action of the hot gases surrounding them.

A further feature of the invention consists in the arrangement of cars for conveying the material through the continuous heating and cooling compartments of the furnace. The arrangement of cars end to end, and extending throughout the length of the compartments, provides a convenient means of charging and discharging cars from the furnace, since it is only necessary to provide tractive means for forcing a car loaded with material into the heating end of the compartment by which the train of cars is moved forwardly and a car is discharged from the cooling end of the compartment. The material is then removed from the discharged car after which the car is placed at the charging end of the furnace in position to be loaded, engaged by the tractive means and charged into the furnace.

The form of construction at present preferred is illustrated in the accompanying drawings, in which—

Figure 1 is a view of the furnace partly in plan and partly in section along the line 1—1 of Figure 3;

Figure 2 is a view along the line 2—2 of Figure 1;

Figure 3 is a view along the line 3—3 of Figure 1;

Figure 4 is a view along the line 4—4 of Figure 1;

Figure 5 is a view along the line 5—5 of Figure 1;

Figure 6 is a view along the line 6—6 of Figure 4;

Figure 7 is a view along the line 7—7 of Figure 3;

Figure 8 is a view in elevation of the arrangement of piping and connections constituting the recuperator system in the furnace, and Figure 9 is a plan view of the recuperator, piping and connections.

Referring to the drawings in which like characters refer to corresponding parts throughout the several views, the furnace is set in an emplacement such as a concrete pit 10 and consists of a heating unit A and a cooling unit B enclosed within side walls 11 and 12, and end walls 13, 14, 15, 16 and 17. The furnace structure is braced and held together by buck staves 18 and tie rods 19.

The heating unit A, comprising the furnace proper, is of the underfired type, and is divided laterally into two compartments C and D by an intermediate wall 20. Each of these compartments consists of a longitudinally extending heating chamber 21, a plurality of combustion chambers 22 and a flue chamber 23. The top wall of each of the heating chambers 21 is in the form of the usual arch 24, and the floor of the chamber consists of a top section 25 supported by partitions 26 separating the combustion chambers 22 which are arranged underneath the heating chambers, in this construction eight combustion chambers being employed, four under each heating chamber. The top section 25 in each of the compartments C and D has upstanding outer side walls 27 and inner side walls 28, between the latter of which and the intermediate wall 20 are upwardly tapering passages 29 through which the several combustion chambers 22 communicate with the heating chambers 21. Passing through the furnace from end to end are tracks 30 supported on beds 31, and in the heating unit A of the furnace the track beds 31 are supported by the top sections 25. The material to be treated in the furnace is conducted through the heating and cooling units A and B on cars 32 mounted on the rails 30, the material usually being contained in boxes laid on the cars preparatory to their introduction into the heating unit A. The combustion chambers 22 are designed for the use of pulverized coal, oil, gas, or other suitable substance, which is supplied thereto by means of burner tubes 33 serving the combustion chambers 22 through the side walls 11 and 12 of the furnace. The combustion chambers are of the same cross sectional area throughout and are provided with clean-out ports 34 closed by doors 35. The fuel may be supplied to the burner tubes by any suitable piping or conveyor system dependent upon the nature of the fuel and which is not illustrated since any well known arrangement subserving the purpose may be employed as will be readily understood.

The heating chambers 21 are in communication with the flue chambers 23 through passages 36 in the outer walls 27, and suitable dampers 37 are provided for regulating the flow of waste gases from the chambers 21 through the passages 36 into the flue chambers 23. For the purpose of removing any non-combustible matter which may be precipitated in the flue chambers 23 from the chambers 21, clean-out openings 38 are provided fitted with doors 38$^a$. The waste gases in the flue chambers 23 flow into the passage 39 by which they are conducted out of the furnace and to the atmosphere by a stack 40.

In order that the combustible constituents of the fuel may be burned, and the gases injected into the combustion chambers, air under pressure is supplied to the burners; and to economize fuel the air is preheated. For the purpose of preheating the air a recuperator is employed which consists of a system of pipes extending throughout the cooling and heating units of the furnace, the piping and connections constituting the recuperator being illustrated in detail in Figures 8 and 9. Like the heating unit A the cooling unit B of the furnace is divided into two compartments E and F, by the intermediate wall 20. Each of these compartments contains a system of pipes 41 in a heat conducting unit, forming part of the recuperator, one of which is disposed on each side of the track 30. The pipes 41 are connected at one end to a manifold 42 which is connected by means of a pipe 43 with a blower 44. The opposite ends of the pipe 41 are connected to a manifold 45, and both systems of pipes 41 in each of the compartments E and F are connected to pipes 46 by means of pipes and connections 47, the pipes 46 passing through the flue chamber 23. Each of the burners 33 opening into the various combustion chambers 22 in the compartments C and D of the heating unit are connected to the pipes 46 by means of connections or couplings 48 as illustrated in detail in Figure 9.

The heating and cooling chambers C and E and the corresponding chambers D and F form continuous compartments C—E and D—F in each half of the furnace, each set of heating and cooling chambers being separated by a partition or door 49 mounted to slide between guides 50, and the ends of each of the compartments C—E and D—F are closed by sliding doors 51, which, as well as the doors 49, are raised or lowered as by means of chains 52 passing over sheaves (not shown), and which may be provided with means capable of mechanical operations to raise and lower the doors.

In operation the furnace is charged with cars placed end to end extending throughout the compartments C—E and D—F, there being, for example, six cars in each half of the furnace, three in each of the heating chambers and three in each of the cooling chambers. With the charge of material on the cars in the furnace, the doors 49 and 51 are lowered, the material being spaced on the cars to allow the intermediate doors 49 to come to rest on the surface of a car. The material on the cars situated in the heating chambers 21 is subjected to the hot gases which pass from the combustion chambers 22 into the heating chambers 21 through the passages 29, the combustion chambers 22, although of uniform cross sectional area throughout, being of sufficient area to cause a reduction in velocity of the burning gases so that the residues of combustion are deposited to a great extent in these chambers before the gases pass into the heating chambers 21. In practice the temperature in the heating chambers 21 is maintained at approximately 1600° F., but it will be evident that the temperature at different points along the length of the heating chambers may be varied since the burner tubes 33 are independent one of the other. After heating the material on the cars the waste gases pass from the heating chambers 21 downwardly through the passages 36, to the flue chambers 23, where the hot gases surround the pipes 46 and heat the incoming air supplied to the burners 33 by the blowers 44. Before passing into the pipes 46 the air supplied by the blowers is first heated in the system of pipes 41 forming that part of the recuperator which is in the cooling unit B of the furnace. In the cooling unit B are the cars containing material which has been subjected to heat treatment in the heating section A of the furnace, and the heat given off by the material in cooling is utilized in heating the air passing through the recuperator units 41. The temperature of the cooling unit is, in practice, normally about 1000° F. In order to increase the speed of absorption by the recuperators of the heat radiated by the hot material on the cars in the cooling chamber, and also contained in the hot gases conducted into the flue chambers 23 from the heating chambers 21, the recuperator pipe lines are provided with pipes or rods 53 constituting "core-busters" which serve to decrease the area of the pipes and force the air passing therethrough closer to the surface of the pipes, or, in other words to break up the central air columns which would otherwise be formed in the passage of the air through the pipes. By changing the size of the pipes or rods which form the "core-busters", changes in the heating effect of the recuperator can be produced depending upon the conditions required for most effective operation of the recuperator.

When it is desired to discharge a car of material from the furnace, the doors 49 and 51 are raised and a car loaded with material is placed on the track 30 outside of the furnace and over a coil chain 54 or other convenient device by which the car is forced into the furnace and a car at the other end pushed out. The car driven out of the furnace is then unloaded, placed on the track 30 at the entrance to the heating unit A of the furnace where it is charged with material ready to be introduced into the furnace again.

I claim:

1. In a furnace, a heating unit having a flue chamber for the gases of combustion, a cooling unit and a recuperative device extending through said cooling unit and flue chamber.

2. In a furnace, a heating unit and a cooling unit forming a continuous compartment through which material may be conveyed, said heating unit having a flue chamber for the gases of combustion, and a recuperative device extending through the cooling portion of said compartment and through said flue chamber.

3. In a furnace, a heating unit and a cooling unit, said heating unit having a flue chamber for the gases of combustion, and a recuperative device extending through said heating and cooling units comprising a plurality of pipes forming a heat conducting surface in said cooling chamber, and a pipe connected with said heat conducting surface and extending through said flue chamber.

4. In a furnace, a heating unit having a heating chamber, a combustion chamber and a flue chamber, passages connecting said chambers for the circulation of hot gases through said heating chamber and into said flue chamber, a cooling unit, and a recuperative device comprising a plurality of pipes forming a heat conducting surface in said cooling chamber, and a pipe connected with said heat conducting surface and extending through said flue chamber.

5. In a furnace, a heating unit and a cooling unit, and a recuperative device extending throughout said heating and cooling units, and comprising a plurality of pipes forming a heat conducting surface in said cooling unit, and a pipe connected with said heat conducting surface and extending through said heating unit, said pipes being provided with "core-busters."

6. In a furnace, a heating unit having a heating chamber, a combustion chamber, and a flue chamber, passages connecting said chambers for the circulation of hot gases through said heating chamber and into said flue chamber, a cooling unit forming with said heating unit a continuous compartment comprising said heating chamber and a cooling chamber through which the material may be conveyed, and a recuperative device for absorbing heat given off by the material in said cooling unit and the hot gases in said flue chamber.

7. In a furnace, a heating unit having a heating chamber, a combustion chamber, and a flue chamber, passages connecting said chambers for the circulation of hot gases through said heating chamber and into said flue chamber, a cooling unit forming with said heating unit a continuous compartment comprising said heating chamber and a cooling chamber through which the material may be conveyed, and a recuperative device for absorbing heat given off by the material in said cooling unit and the hot gases in said flue chamber, and means in said recuperative device for varying the speed of absorption of heat by the latter.

8. In a furnace, a heating unit having a heating chamber, a combustion chamber provided with a burner and a flue chamber, passages connecting said chambers for the circulation of hot gases through said heating chamber and into said flue chamber, a cooling chamber forming with said heating chamber a continuous compartment through which the material may be conveyed, and a recuperative device for supplying air to said burner tube, and for preheating said air first by circulating it through said cooling chamber and then through said flue chamber.

9. In a furnace, a heating unit and a cooling unit forming a continuous heating and cooling compartment, a track extending the length of said compartment, said heating unit including a heating chamber and a series of combustion chambers and a flue chamber arranged beneath said heating chamber, passages connecting said chambers for the circulation of hot gases through said heating chamber and into said flue chamber, and a recuperative device extending throughout said cooling unit and through said flue chamber.

10. In a furnace, a heating unit having an outlet chamber for the gases of combustion, a cooling unit and a recuperative device extending through said cooling unit and outlet chamber, said heating and cooling units forming a continuous compartment, a track extending through said compartment, a plurality of cars on said track placed end to end for conveying material through said compartment, and means for introducing a car into said heating unit whereby a car is discharged from said cooling unit.

11. In a furnace, a heating unit having an outlet chamber for the gases of combustion, a cooling unit and a recuperative device extending through said cooling unit and outlet chamber, said heating and cooling units forming a continuous compartment, comprising a heating chamber and a cooling chamber, a track extending through said compartment, a plurality of cars on said track placed end to end for conveying material through said compartment, and means located outside of said heating unit for exerting a tractive force to charge a car into the heating chamber whereby a car is discharged from the cooling chamber.

12. In a furnace, a heating unit and a cooling unit forming a continuous compartment, comprising a heating chamber and a cooling chamber, a recuperative device extending through the cooling chamber, a track extending through said compartment, a plurality of cars placed end to end for conveying material through said compartment, doors for closing the ends of said compartment and an intermediate door for separating said heating and cooling chambers, and means for exerting a tractive force on said cars whereby when a car is charged into the heating chamber a car is discharged from the cooling chamber.

In testimony whereof I affix my signature.

WILLIAM HENRY FITCH.